Oct. 9, 1934.  A. URFER  1,976,270
MEANS FOR ILLUMINATING DIALS OF INSTRUMENTS
Original Filed March 26, 1929
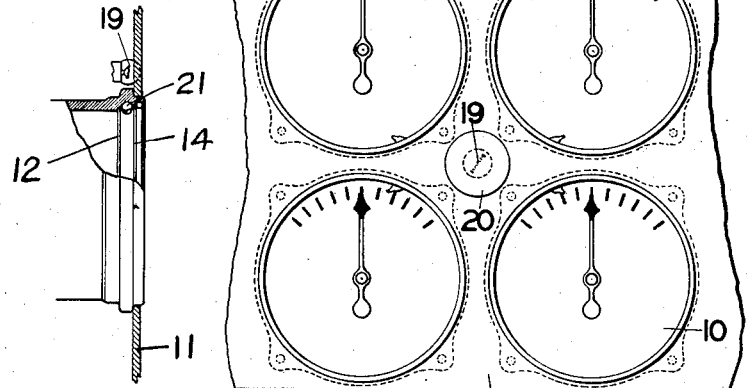
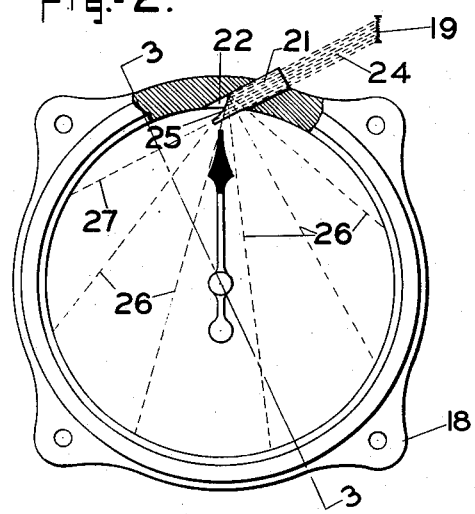
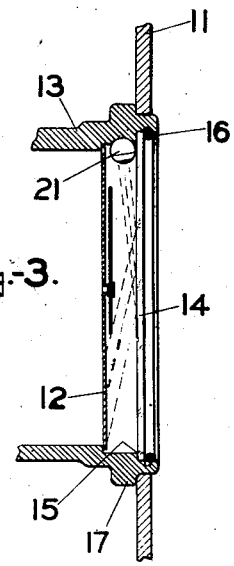
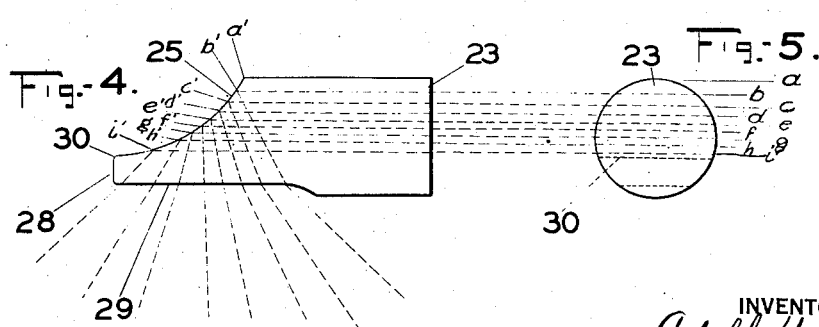
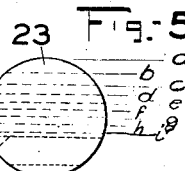
INVENTOR
Adolf Urfer
BY
Cooper, Kerr & Dunham
ATTORNEYS Patented Oct. 9, 1934

1,976,270

UNITED STATES PATENT OFFICE 1,976,270

MEANS FOR ILLUMINATING DIALS OF INSTRUMENTS

Adolf Urfer, Brooklyn, N. Y., assignor to Pioneer Instrument Company, Incorporated, Brooklyn, N. Y., a corporation of New York Application March 26, 1929, Serial No. 349,946
Renewed September 1, 1932

7 Claims. (Cl. 240—2.1)

This invention relates to means for illuminating the dials of instruments. More specifically, this invention relates to means whereby the dial of an instrument may be indirectly and uniformly illuminated.

Among the objects of the invention is to provide means for evenly illuminating the dial of an instrument throughout its area.

Another object of the invention is to provide means for indirectly illuminating the complete surface of a dial of an instrument without there appearing any shadows.

Another object of the invention is to provide means for indirectly illuminating the dial of an instrument without necessitating the existence of an opening for permitting light to enter the instrument or any part thereof.

Another object of the invention is to provide illuminating means which may be easily installed on a standard type of instrument and which is not of such special design as to render it useful only for a few types of instruments.

It is a further object of the invention to provide an illuminating arrangement which enables the use of a single filament of small dimensions in conjunction with optically clear means for transmitting light which also is of small dimension whereby the space required for the several instruments on an instrument board of, for example, an airplane is of a minimum area. In this connection it is intended that one illuminating filament be provided for illuminating all four of a group of four instruments which may be placed as close to one another as their constructions will permit and with the illuminating source at the center of the group.

In brief, the objects of this invention are attained by the use of a small prism properly designed and positioned in the wall of an instrument between its dial and cover-glass. The design of the prism is such as to permit light rays, emitted from a convenient light source, to pass through the prism and be evenly distributed by it over the dial area. Either in design or in the positioning of the prism or in both, provision is made to assure that some of the light distributed by the prism will be directed against the rear surface of the cover-glass at such a flat angle as to cause reflection from the surfaces of the cover-glass and onto the part of the dial most distant from the prism. By achieving this desideratum shadows upon the dial are obviated and the light entering the instrument in this manner is re-reflected within the confines of the instrument to such an extent as to insure complete illumination of the dial.

For a more detailed description reference may be had to the drawing, in which:—

Fig. 1 is a view of the front of a portion of an instrument board upon which a group of four instruments is mounted.

Fig. 2 is a front view of an instrument with a portion of its wall broken away to show the means whereby light is distributed within the casing.

Fig. 3 is a section on line 3—3 of Fig. 2.

Fig. 4 is a large size view of a prism illustrating how light is evenly distributed thereby.

Fig. 5 is an end view of the prism of Fig. 4.

Fig. 6 illustrates a side view of the front portion of an instrument with a part of the wall cut away.

In Fig. 1 I have illustrated the manner in which my invention is applied to the indirect illumination of a group of four instruments 10, each of which is mounted upon an instrument board 11. The instruments might be of any combination such as would be used on aircraft, for example, indicators for air speed, rate of climb, altitude, and a tachometer. Although the invention has particular advantages (which will be referred to hereinafter) with certain kinds of instruments, it is applicable to all kinds.

Indirect systems of illuminating are preferred for aircraft instrument boards because of the desirability of maintaining dark the confines of the cockpit so that the pilot may not be confused by stray light when making a landing during the night. It is readily appreciated that the problems encountered in devising indirect systems for illuminating the dials of instruments may afford much trouble because of the difficulty of obtaining uniform illumination of the entire surface of each instrument.

In Figs. 2 and 3 I have illustrated a preferred form of my invention whereby even and complete illumination of a dial 12 is accomplished. An instrument 10 has a casing or wall 13 in which dial 12 is carried. A cover-glass 14 is disposed against a circular shoulder 15 in the wall 13 and a snap-ring 16 maintains it in place. The area of the cover-glass is substantially co-extensive with the area of the dial.

It is the usual custom to mount the instrument, whatever its character or its intended use might be, just rearward of an instrument board 11, Fig. 3, for which purpose a flange 17 and ears 18, Fig. 2, are provided. The flange 17 is so located as to permit the positioning of a filament 19 external of the instrument, Fig. 1, and preferably between the planes of the instrument dial 12 and the cover-glass 14. Such a positioned filament constitutes the light source from which all of the necessary light for illuminating one or more dials is derived. When there is a group of instruments to be illuminated from a single light source, each of the instruments may be arranged symmetrically in respect to the light source, Fig. 1, in which case each of the instruments will receive the same degree of illumination. The use of but one light source 19 of small dimension enables a grouping of instruments as close together as their constructions permit.

The placing of the filament 19 of a light source close to the instrument board 11 requires a special construction for accommodating the bulb portion of the light source which extends forward of the rear surface of the instrument board. I have provided for this condition by utilizing a removable cap 20, Fig. 1, which fits tightly against the front surface of the instrument board. The construction of this cap and of related devices for supporting the light source forms no part of the present invention, and will not be further described herein.

It is always advantageous in measuring instruments to maintain the space defined by the wall 13, dial 12 and cover-glass 14 free from communication with the atmosphere so that the instrument may be kept dry and free of dirt. In certain instruments, such as in some air speed indicators, it is particularly necessary that this space be maintained air-tight. As indirect illumination is practically indispensable for instruments used on aircraft, a truly involved problem is presented in obtaining proper illumination of a dial without neglecting air-tight requirements. Proper illumination requires an even distribution of light over the entire area of the dial and there must be no shadows. For achieving these desirable conditions, I use light distributing means associated with each instrument, which means serves to distribute a pencil of rays into a fan-like or flat pencil of rays extending across the dial. The light rays are evenly spread into the flat pencil of rays by a reflecting surface. The illumination of the entire area of the dial is accomplished by the even distribution of light in this manner and by using another reflecting means, in the form of the cover-glass, for directing rays of light to the portion of the dial most remote from the light distributing means.

In its preferred form the light distributing means consists of a glass prism 21 placed in the wall 13 of an instrument between the dial 12 and the cover-glass 14. The prism is preferably large enough to almost fill the width of the space between the dial and cover-glass so as to admit sufficient light, and it is made with a round cross-section because of the convenience had in using a drilled hole 22. This convenience is particularly appreciated where the invention is to be installed on already fabricated old-time instruments and also because of the ease by which the prism may be rotated to adjust the angle of the faces of the prism when the prism is installed. The prism may be cemented in place to create a sealed relation between it and the instrument wall. So as to assure maximum optical efficiency the prism is positioned so that the rays of light from filament 19 will enter the same, square to the external surface 23 of the prism, and pass through the prism without unnecessary refraction or reflection.

In Figs. 4 and 5 I have illustrated on a large scale, the design of the prism so that it may be easily understood how rays of light 24, (diagrammatically illustrated in Fig. 2) entering the prism through surface 23, are reflected from a curved surface 25 and distributed into a fan-like or flat pencil of rays 26. The light rays thus distributed are spread so as to extend across the area of the dial. Rays of light 27 will pass directly through the prism and some of these will leave the prism at surface 28. In this manner the portion of the instrument in the vicinity and in prolongation of the prism will be assured the desired amount of illumination.

The prism may be mathematically designed to distribute light evenly, and in Figs. 4 and 5 I have shown how the same result may be obtained graphically. Upon surface 23 the area $a\,i$ corresponds to the vertical projection of the curved surface 25 and this area is divided into a number of equal areas by horizontal parallel lines $b, c, d, e, f, g, h$ and $i$, Fig. 5. These lines are projected horizontally, onto a figure representing the side elevation of the prism, Fig. 4. The sloping line $a'\,b'$ on Fig. 4 represents the sloping height of an area greater than that of area $a\,b$ an amount proportional to the amount of increased distribution of light desired. The sloping areas between the points $a', b', c', d', e', f', g', h'$ and $i'$ will be equal to each other. Accordingly, the ratio of the corresponding areas, for example, $$\frac{a'b'}{ab}$$

is a function of the amount of distribution of light caused by the entire curved surface 25.

Surface 29 through which the distributed rays of light 26 leave the prism is a plane parallel to any lateral element 30 of reflecting surface 25.

When but a small pencil of light is permitted to enter an instrument just forward of its dial, shadows are likely to appear at portions of the dial most remote from where the light enters. In order to overcome this disadvantageous result I so position prism 21 as to cause the flat pencil of rays 26 to strike the rear surface of glass 14 at a flat angle, Fig. 3. By this arrangement rays of light are reflected by the cover-glass onto the portion of the dial most remote from prism 21 and the complete area of the dial is uniformly illuminated.

It should be readily understood from the foregoing that the form of the invention described is one which embodies various principles which have been scientifically applied to produce exceptionally good indirect lighting conditions in an economic and optically efficient manner. Because of the narrowness of the surface between the dial and the cover-glass and the flat initial angle of reflection of the light rays within the instrument, the evenly distributed light will be reflected and re-reflected within the instrument so as to produce complete uniformity of illumination of the dial.

While the form of device herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

I claim:

1. The combination with an instrument having a dial and an externally disposed light source, of a cover-glass for the instrument and disposed opposite the dial, optical reflecting means adjustably disposed in the wall of the instrument between the dial and said cover-glass, said optical reflecting means having a reflecting surface directing light from said source to the space between the dial and said cover-glass, some of said light being reflected by said cover-glass upon the dial.

2. The combination with an instrument having a dial and an externally disposed light source, of a cover-glass opposite the dial, and a prism mounted in the wall of the instrument between the dial and said cover-glass, said prism having a surface curved so as to distribute a pencil of light rays entering the prism from the light source into a flat pencil of light rays and being so positioned as to direct said flat pencil of light rays against a surface of said cover-glass.

3. The combination with an instrument having a dial and an externally disposed light source, of a cover-glass opposite the dial, and a prism disposed in the wall of the instrument and in the path of rays of light emitted from the source of light, said prism having a surface for reflecting rays of light within the prism evenly over an area equivalent to that of the dial.

4. In an instrument mounted in an instrument board and having a dial rearward of said instrument board and a cover-glass so disposed that its rear surface may receive light from the rear of the instrument board, said dial and cover-glass forming an air-tight space with the wall of the instrument, a light source disposed beside the instrument and between the planes of the dial and cover-glass, and a prism in the wall of the instrument between the dial and cover-glass for passing and distributing light rays from said light source to the space between the dial and the cover-glass.

5. In combination, a plurality of instruments mounted on an instrument board, each of said instruments having a dial rearward of the instrument board and a cover-glass so disposed that its rear surface may receive light from the rear of the instrument board, a light source centrally disposed beside said instruments and between the planes of the dials and cover-glasses thereof, whereby each of said instruments may receive substantially the same degree of illumination from said light source, and an elongated glass rod disposed in the wall of each instrument between the dial and cover-glass and having a curved surface at its inner end for passing and distributing light rays from said source to the spaces within the several instruments between the dial and cover-glass thereof.

6. In combination, an instrument mounted on an instrument board and having a dial and cover-glass viewable through an opening in said instrument board, a source of light disposed behind said board adjacent to and externally of the instrument, and an optically clear member disposed in the wall of the instrument between the dial and cover-glass for passing light from said source into the space between the dial and cover-glass, said member being of sufficient length to extend into the instrument and having a reflecting surface for distributing said light over the entire dial.

7. An arrangement for illuminating the dial of an instrument having a dial and cover-glass and mounted on an instrument panel, comprising a source of light disposed behind the panel and externally of the instrument, and optical means disposed in and projecting through the wall of the instrument into the space between the dial and cover-glass for passing light from said source into said space, said optical means having a reflecting surface at the end within the instrument and disposed at an angle with respect to and toward the cover-glass for distributing the light over the entire dial by reflection thereof from said cover-glass to said dial without causing any glare when the instrument is viewed from the front of the panel.

ADOLF URFER.